United States Patent Office 3,269,898
Patented August 30, 1966

3,269,898
AGENTS FOR PROTECTING MATERIALS AGAINST TEXTILE PESTS
Klaus Langheinrich, Leverkusen, Herbert Klesper, Cologne-Flittard, and Josef Hilger and Friedrich Muth, Leverkusen-Bayerwerk, Germany, assignors to Farbenfabriken Bayer Aktiengesellschaft, Leverkusen, Germany, a German corporation
No Drawing. Filed Aug. 22, 1962, Ser. No. 218,507
Claims priority, application Germany, Aug. 25, 1961, F 34,774
3 Claims. (Cl. 167—38.6)

The present invention relates to and has as its objects new and useful agents for protecting materials against textile pests especially with an outstanding activity against moths and beetles. The invention moreover relates to a method for rendering materials proof against the attack of such pests. More specifically this invention is concerned with protective agents consisting of (a) salts of sulphonamides of the general formula

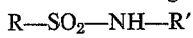

and (b) compounds of the general formula

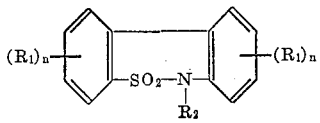

In the above formulae R and R' stand for aromatic or aliphatic radicals and R' can also represent an aralkyl radical, whereby the aforesaid radicals are preferably to be substituted by halogen atoms and/or trifluoromethyl groups, and $R_1$ stands for halogen atoms, trifluoromethyl, alkyl, alkoxy, nitro, cyano, thiocyano, alkylsulphamido or arylsulphone groups, or also for the radical of a (thio)-urea or carbamic acid ester, while $R_2$ stands for hydrogen, a lower alkyl or alkenyl radical optionally substituted by halogen atoms or hydroxyl groups, or for the radical of an organic carboxylic or sulphonic acid as well as preferably the cation of an inorganic or organic base, such as e.g. a sodium, potassium, alkyl ammonium or alkanolammonium ion, and $n$ stands for a whole number from 1 to 4.

In accordance with the present invention it has now been found that mixtures of the above mentioned compounds preferably in organic solvents such as are applied, for example, in dry cleaning, are particularly suitable as agents for protecting materials against textile pests.

The inventive mixtures prosses a considerably increased activity against keratin pests as compared with the individual components by virtue of a synergistic effect.

In particular, a protection of karatin-containing materials against Anthrenus and Attagenus, lasting longer than can be attained with the individual components when used alone in high concentrations, can be achieved with the mixtures acording to the invention even with significantly smaller concentrations of the protective agents.

The sulphonamides of the above general formula to be employed in the mixtures according to the present invention are known from the German patent specifications 828,458, 890,883, 1,049,622, 1,062,238 and 1,103,283.

As has been further found, suitable second components are especially those 6-dibenzo-(c,e)-o-thiazine 5-dioxide-derivatives of the above formula in which $R_2$ stands for the cation of an inorganic or organic base, such as e.g. a sodium, potassium, alkylammonium or alkanolammonium ion.

These compounds may be prepared as suggested in Belgian patent specification No. 608,584. As already mentioned above the mixtures according to the present invention distinguish themselves by an excellent activity against moths and other textile pests. Therefore the special utility of the invention mixtures is in the field of protecting materials against the attack of keratine pests, particularly against moths and also larve of Anthrenus and Attagenus.

The following examples are given for the purpose of illustrating the present invention in more detail, but without limiting it in any way.

*Example 1*

140 g. of 7,9,10-trichloro-6-dibenzo-(c,e)-o-thiazine-5-dioxide are dissolved with heating in 500 g. of a 50% solution of the sodium salt of chloromethane sulphotrichloroanilide in isopropanol with the addition of 17 g. of sodium hydroxide,
200 g. of isopropanol and
143 g. of cyclohexanone.

There is obtained 1 kg. of a clear stable solution, which may be applied for proofing against moths and beetles (Anthrenus and Attagenus) in solvents such as are usual in dry cleaning, in the following way:

50 kg. of woollen textiles are cleaned in 500 litres of heavy or washing benzine (or carbon tetrachloride, tri- or perchlorethylene) with the addition of 600 g. of the protective solution produced as described above, according to the manner customary in dry cleaning. The thus treated and cleaned goods are protected against the attack of moths and beetles.

In the same way as described above there may be employed mixtures of the sodium or potassium salts of 8-chloro-6-dibenzo-(c,e)-o-thiazine - 5 - dioxide or 7,9-dichloro-6-dibenzo-(c,e)-o-thiazine - 5 - dioxide and the sodium salt of chloromethane sulphotrichloroanilide.

*Example 2*

The synergistic effect of the mixture produced according to the invention in Example 1 in comparison to the individual components is apparent from the following table:

| | Preparation | Percent active agent calculated on the weight of the material to be protected | Biological evaluation protective effect against— | | |
|---|---|---|---|---|---|
| | | | Moths | Anthrenus | Attagenus |
| A | Sodium salt of chloromethane sulphotrichloroanilide. | 0.1<br>0.2<br>0.3<br>0.4<br>0.5 | Good<br>Very good<br>do<br>do<br>do | Not enough<br>do<br>do<br>Poor<br>Good | Not enough.<br>Do.<br>Do.<br>Poor.<br>Not sufficient. |
| B | Sodium salt of 7,9,10-trichloro-6-dibenzo-(c,e)-o-thiazine-5-dioxide. | 0.1<br>0.2<br>0.3<br>0.4<br>0.5 | Not sufficient<br>do<br>Good<br>Very good<br>do | Not enough<br>do<br>do<br>Poor<br>Not sufficient | Not enough.<br>Do.<br>Do.<br>Poor.<br>Not sufficient. |
| C | Mixture of A+B in ratio of A:B=5:3. | 0.1<br>0.2<br>0.3<br>0.4<br>0.5 | Very good<br>do<br>do<br>do<br>do | Not sufficient<br>Good<br>Very good<br>do<br>do | Not sufficient.<br>Do.<br>Good.<br>Very good.<br>Do. |

The testing of the moth and beetle proofing effect was carried out according to W. Frey, "Die Prüfung von Wollschutzimprägnierungsmitteln gegen Larvenfrass der Kleidermotte mit Hilfe der visuellen Beurteilungsmethode," Nachrichtenblatt des Deutschen Pflanzenschutzdienstes, 10th volume, No. 12, December 1958.

*Example 3*

150 g. of 7,9,10-trichloro-6-dibenzo-(c,e)-o-thiazine-6-propionyl-5-dioxide are dissolved with heating in 500 g. of a 50% solution of the sodium salt of chloromethane sulphotrichloranilide in isopropanol with addition of 200 g. of isopropanol and 150 g. of cyclohexanone.

There is obtained 1 kg. of a clear stable solution which can be applied with equal effect for proofing against moths and beetles of wool textiles according to the manner given in Example 1.

With the same effect there may be employed mixtures of (a) the following 6-dibenzo-(c,e)-o-thiazine-5-dioxide-derivatives:

7,9,10-trichloro-6-dibenzo-(c,e)-6-n-butyl-o-thiazine-5-dioxide 7,9,10-trichloro-6-dibenzo-(c,e)-6-methyl-o-thiazine.5-dioxide 7,9,10-trichloro-6-dibenzo-(c,e)-6-ethyl-o-thiazine-5-dioxide 7,9,10-trichloro-6-dibenzo-(c,e)-6-allyl-o-thiazine-5-dioxide 7,9,10-trichloro-6-dibenzo-(c,e)-6-β-chloroethyl-o-thiazine-5-dioxide 7,9,10-trichloro-6-dibenzo-(c,e)-6-acetyl-o-thiazine-5-dioxide and (b) chloromethane sulphotrichloranilide.

*Example 4*

150 g. of 7,9-dichloro-10-trifluoromethyl - 6 - dibenzo-(c,e)-o-thiazine-5-dioxide are dissolved with heating in 500 g. of a 50% solution of chloromethane sulpho-(tetrachloro-4-phenyl)-anilide or an analogous derivative of diphenyl, diphenylether, diphenyl sulphide, diphenylmethane, or the like in isopropanol, with addition of 50 g. of triethanolamine, 200 g. of isopropanol and 100 g. of cyclohexanol.

The treatment of wool textiles with 1.2% concentrations of this mixture, calculated on the weight of the material to be proofed, yields in employment in dry cleaning baths to a sufficient protective effect against attacks of moths, Anthrenus and Attagenus larvae.

We claim:

1. A composition for protecting textile materials against moths and beetles consisting essentially of
   (a) a sulphonamide of the formula

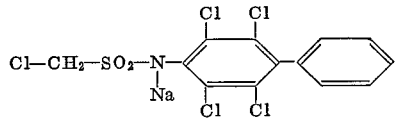

and (b) an active synergistic amount of a 6-dibenzo-(c,e)-o-thiazine-5-dioxide of the formula

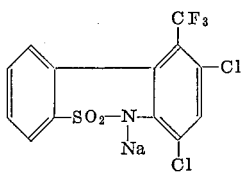

2. A composition for protecting textile materials against moths and beetles, consisting essentially of an active amount of a mixture of a
   (A) chloromethane sulfotrichloroanilide of the formula

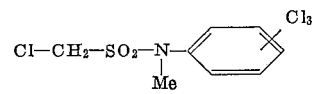

wherein Me is a member selected from the group consisting of alkali metal, lower alkylammonium and lower alkanol ammonium; and
   (B) 7,9,10-trichloro-6-dibenzo-(c,e)-o-thiazine-5-dioxide having the formula

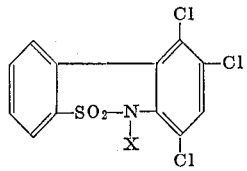

wherein X is a member selected from the group consisting of sodium and potassium, the ratio by weight of A to B being about 5 to at least 3.

3. A composition according to claim 2 wherein the ratio of the composition employed in the treating bath is about .2–.5% by weight of the material to be protected.

References Cited by the Examiner

UNITED STATES PATENTS

| | | | |
|---|---|---|---|
| 1,955,207 | 4/1934 | Stotter | 167—37 |
| 2,711,426 | 6/1955 | Wynn | 167—38.6 |
| 2,740,814 | 4/1956 | Cross et al. | 167—30 |
| 2,867,658 | 1/1959 | Frick | 260—551 |
| 2,937,202 | 5/1960 | Slagh et al. | 167—30 |
| 3,034,855 | 5/1962 | Frick et al. | 167—37 |
| 3,198,793 | 8/1965 | Hilger et al. | 167—38.6 X |

FOREIGN PATENTS

| | | |
|---|---|---|
| 520,691 | 6/1953 | Belgium. |
| 828,458 | 1/1952 | Germany. |
| 890,883 | 9/1953 | Germany. |
| 1,049,623 | 1/1959 | Germany. |
| 1,079,380 | 4/1960 | Germany. |
| 1,103,283 | 3/1961 | Germany. |
| 738,758 | 10/1955 | Great Britain. |

JULIAN S. LEVITT, *Primary Examiner.*

JOSEPH BRUST, *Examiner.*

G. A. MENTIS, *Assistant Examiner.*